(12) United States Patent
Welton et al.

(10) Patent No.: US 6,696,513 B1
(45) Date of Patent: Feb. 24, 2004

(54) CAPSTOCK POLYMER COMPOSITION

(75) Inventors: Nicholas Jason Welton, Solihull (GB); Keith Herbert Dodd, Richmond Park (GB)

(73) Assignee: H. B. Fuller Coatings Ltd., Birmingham (GB)

( * ) Notice: Subject to any disclaimer, the term of this patent is extended or adjusted under 35 U.S.C. 154(b) by 0 days.

(21) Appl. No.: 09/868,831

(22) PCT Filed: Dec. 22, 1999

(86) PCT No.: PCT/GB99/04353

§ 371 (c)(1), (2), (4) Date: Nov. 29, 2001

(87) PCT Pub. No.: WO00/37557

PCT Pub. Date: Jun. 29, 2000

(30) Foreign Application Priority Data

Dec. 22, 1998 (EP) .............................................. 98310616

(51) Int. Cl.$^7$ .................................................. C08K 3/10
(52) U.S. Cl. ........................ 524/405; 524/409; 524/432
(58) Field of Search ................................ 524/405, 404, 524/409, 432

(56) References Cited

U.S. PATENT DOCUMENTS

| | | | | | |
|---|---|---|---|---|---|
| 4,032,498 A | * | 6/1977 | Dany et al. | ............ | 260/30.6 R |
| 4,129,535 A | * | 12/1978 | Elcik | ..................... | 260/23 XA |
| 4,965,309 A | * | 10/1990 | Batdorf | ....................... | 524/405 |
| 5,200,446 A | * | 4/1993 | Bergner | ....................... | 524/173 |
| 5,322,899 A | * | 6/1994 | Grunewalder et al. | ...... | 525/199 |

OTHER PUBLICATIONS

Arakawa, K., et al., "Effect of Flame Retardant Elements on Combustibility of Poly (methyl methacrylate)", Kobunshi Ronbunshu (Collected Polymer Articles), vol. 30, No. 10, pp. 643–647 (Oct. 1974).

Derwent Publications Ltd. World Patent Index (WPI) abstract of Japanese Patent Publication No. 54034359, 1979.

Razinskaya, I.N., et al., "Investigation of Synergism of Fireproofing Compounds in Compositions Based on PMMA Using Design of Experiments", Plast Massy, No. 2, pp. 49–50 (1983).

International Search Report for International Application No. PCT/GB 99/04353, mailed Jun. 15, 2000.

* cited by examiner

Primary Examiner—James J. Seidleck
Assistant Examiner—U. K. Rajguru
(74) Attorney, Agent, or Firm—Senniger, Powers, Leavitt & Roedel

(57) ABSTRACT

The invention relates to a capstock polymer composition comprising a blend of a melt extrudable acrylic polymer component; from 10% to 50% by weight of a halogen donor component; a halogen volatilisation component; and a char-inducing component which induces formation of a char upon application of flame to the composition.

9 Claims, No Drawings

CAPSTOCK POLYMER COMPOSITION

FIELD OF THE INVENTION

The present invention relates to a polymer composition for use as a capstock material for making plastic laminates.

BACKGROUND OF THE INVENTION

Low cost plastics, such as poly(vinyl chloride) (PVC), have many commercial uses but often require capping with other materials if the intended use is likely to prompt unreasonably rapid deterioration of the base plastic or if it is desired to impart colour, gloss, weatherability or some other property to the base plastic.

For example PVC is suitable, because of its low cost, rigidity, ease of processing (for example, by extrusion) and other mechanical properties, for use in a variety of building materials and products. Examples are window systems, including profiles for all types of windows, door sets and associated items; roofline and cladding products, such as fascia, bargeboards, soffits, shiplap and vee groove cladding; rainwater systems, such as guttering, downpipes and accessories; and piping systems, such as waste water and process piping for use above and below ground. Often such products utilise expanded PVC so as to save material and reduce the weight of such products. However, PVC is relatively unstable to heat and light and does not have good durability or resistance to weathering. This may present particular problems when the appearance of the building product, such as a window frame, is important. Deterioration of PVC involves yellowing of the material and may be unsightly, Similarly, the problem of poor weatherability may be of particular concern in, for example, guttering. Deterioration of the PVC guttering may lead to cracks in the material which may ultimately allow egress of water from the guttering.

Other base plastics which may be used in place of, or as well as, PVC in such applications include polybutene, prolypropylene polybutylene terephthalate (PBT), polyamides, and styrene-based polymers, such as acrylonitrile-butadiene-styrene copolymers, high impact polystyrene, and styrene-acrylonitrile copolymers. Such materials may be foamed for cost or weight considerations. These materials generally have one or more of PVC's disadvantages.

One conventional solution to the problem of low durability of the base plastic is to coat the plastic with a thin layer of a capstock material, i.e. another material having better resistance to weathering and perhaps other is desirable properties such as colour or gloss. Such capstock materials are known in the art.

U.S. Pat. No. 3,458,391 discloses a laminated article which comprises in superimposed relationship a rigidity imparting base member having bonded thereto a protective film of a blend of from 90% to 40% by weight of poly (methyl methacrylate) (PMMA) or poly (ethyl methacrylate) and from 10% to 60% by weight of poly (vinylidene fluoride).

U.S. Pat. No. 5,322,899 teaches a capstock polymer composition comprising 30 to 80% of a fluoropolymer component, 5 to 50% of poly (methyl methacrylate) and 5 to 50% of poly (ethyl methacrylate).

International Patent Application No. WO93/05959 discloses a plastic composite comprising an extrusion product having at least two layers including a layer of a first polymeric substance comprising from 1 to 70% by weight of an acrylic material, a fluoropolymer and an inorganic pigment in contact with a second polymeric layer.

Another capstock material containing polyvinylidene fluoride is disclosed in European Patent Specification. No. 0151812 A2.

U.S. Pat. No. 5,132,164 also discloses a fluorine resin type film having a multi-layer structure.

Coextrusion methods for producing composite polymers are also known, as described for example in British Patent Specification No. 2071007 A.

Thermoforming a plastic substrate with simultaneous formation of an integral coating on a surface of the thermoplastic is taught in U.S. Pat. No. 5,268,203.

A review of developments in plastic window frames, Is including PVC, coextruded and PMMA-coated profiles, PVC extrusion equipment, expandable PVC, and stabilisers can be found in Macplas Int., June 1991, pages 57 to 64. Blends of self-extinguishing PVC with high impact polystyrene, PMMA and their rheological properties are disclosed in a paper entitles "Fire Retardant Blends, Alloys and Thermoplastic Elastomers", Conference Proceedings Hilton Head Island S.C., $17^{th}$ to $20^{th}$ March 1991, pages 59 to 84.

Whilst fluoropolymers have been suggested widely as capstock ingredients because of their weatherability and chemical resistance, they are extremely expensive in relation to other polymers.

One particularly important property of capstock materials is fire retardancy. In U.S. Pat. No. 4,965,309 a smoke depressant additive for plastics is proposed which comprises an inorganic zinc compound, an inorganic magnesium compound other than magnesium oxide, an inorganic molybdenum compound, and an inorganic cooper compound. Incorporation of such a smoke depressant additive in PVC is proposed.

Japanese Unexamined Patent Specification No. 54/034359 discloses a composition which comprises 100 parts by weight of a polymer mixture consisting of 95–3S parts by weight polytetramethylene terephthalate and 5–65 parts by weight of a methacrylate polymer containing at least 50 weight a of a polymer of methyl methacrylate, 3–40 parts by weight of a halogen compound, such as a bisphenol-A type brominated epoxy resin, 1–30 parts by weight of an antimony compound, such as antimony trioxide, and 3–70 weight % (of total resin) of non-electrically conductive inorganic filler, such as glass fibre and talc.

I. N. Razinskaya et al., Plast Massy, No. 2 (1983), pages 49 to 50, investigated synergism with the simultaneous action of three fireproofing agents, i.e. antimony trioxide, trichloroethylphosphate and polyvinylchloride, in compositions with methyl methacrylate.

Arakawa et al., Kobunshi Ronbunshu (Japanese Polymer Science and Technology), Vol. 31, No. 10 (1974), pages 643 to 647, made a quantitative study of the synereric effect of chlorine and phosphorus or antimony in conferring self-extinguishing properties on poly(methyl methacrylate), using a blend of poly(methyl methacrylate) and a vinyl chloride-vinylidene chloride copolymer.

While acrylic polymers, such as poly(methyl methacrylate), have many of the properties desired in a capstock material, their flammability is a drawback to their use. This drawback can be mitigated, to some extent, by formulating such acrylic polymer capstocks as coextrudates with halogen-donating materials, for example a halogen-containing polymer such as PVC. The halogen-donating polymer provides a source of halogen atoms which can act as a chain breaker in a free radical combustion reaction, in the event of the capstock being exposed to fire. If the base plastic is PVC and the halogen-donating polymer is PVC, a strong bond is formed between identical ingredients of the base plastic and the capstock. However, in order to meet stringent fire safety regulations in many countries, it will often be necessary to include quite large quantities (typically at least about 70% by weight) of halogen-donating polymer in the capstock. Whilst the incorporation of large amounts of, for example, PVC in the composition may have an improving effect upon the fire retardance of the capstock, it may also lead to increased deterioration of the capstock on exposure to U.V. light or other adverse environmental conditions.

It is particularly important for many building materials and products to be resistant to the spread of flame. Ideally, polymer composites for use in such materials and products should meet the standards of BS476 Part 7 in the United Kingdom and should pass corresponding fire safety tests in other countries.

Accordingly, there is a need for capstock materials which exhibit fire retardance, good weatherability and durability, which are cost effective to manufacture, which have good appearance, and which may include colour.

It is therefore an object of the present invention to provide a polymer capstock which is fire retardant and which meets ore or more of these other needs.

SUMMARY OF THE INVENTION

According to the present invention, there is provided a capstock polymer composition comprising a blend of:
- a melt extrudable acrylic polymer component;
- from 10% to 50% by weight of the composition of a halogen donor component;
- an effective amount of a halogen volatilisation agent; and
- a char-inducing component which induces formation of a char upon application of flame to the composition.

DETAILED DESCRIPTION OF THE INVENTION

The invention provides a capstock polymer composition. This comprises a melt extrudable acrylic polymer component that preferably consists of or comprises an acrylic polymer that has a molecular weight of from about 50,000 to about 500,000 on a number average basis. The capstock polymer composition further comprises from about 10% to about 50% by weight of the composition of a halogen donor polymer component, such as poly(vinyl chloride) (PVC), which is adapted to behave as a halogen donor upon application of a flame to the composition. A third ingredient of the composition is a halogen volatilisation agent, such as antimony trioxide or sodium antimonate, while a fourth component is a char-inducing component, that is to say a component that upon application of flame to the composition induces formation of a char upon the surface of the composition and thereby formation of a barrier to penetration of the flame to subjacent material. Typical char-inducing components include vitrifying ceramics and zinc salts, such as zinc stannnate, zinc borate, or a mixture thereof.

In a preferred embodiment of the invention, the melt extrudable acrylic polymer component comprises at least a major amount of a high molecular weight acrylic polymer that has a molecular weight of from about 50,000, more preferably about 100,000, to about 500,000, even more preferably from about 150,000 co about 350,000, on a number average basis. Such acrylic resins can be formed by copolymerisation of esters or amides of acrylic acid or of an α-alkylacrylic acid, for example methacrylic acid. Examples of suitable esters include acrylamide, α-methylacrylamide, methyl acrylate, ethyl acrylate, methyl methacrylate, ethyl methacrylate, and the like. Besides homopolymers, random or block copolymers can also be used. Preferred high molecular weight materials include Oroglas DRT and Oroglas HFI-10 which are available from Atohaas UK Ltd., of 1 Focus Park, Ashbourne Way, Cranmore Boulevard, Shirley, Solihull B90 4QU, England and Diakon, which is available from ICI Acrylics, P.O. Box 90, Wilton Centre, Middlesbrough, Cleveland TS90 8JE, England.

The melt extrudable acrylic polymer component preferably comprises more than about 50% by weight of a high molecular weight acrylic polymer and up to about 50% by weight of a low molecular weight acrylic polymer, having, for example, a molecular weight in the range of from about 10,000 co about 100,000 on a number average basis. Typical low molecular weight acrylic polymers Include Paraloid B-67 which is available from Rohm & Haas, of Lennig Mouse, 2 Masons Avenue, Croydon CR9 3NB, England. Preferably, the total melt extrudable acrylic polymer component comprises from about 40 to about 75% by weight of the capstock polymer composition.

The capstock polymer composition of the invention incorporates from 10% to 50% by weight of the composition, preferably 10 to 30% by weight of the composition, of a halogen donor component, for example PVC, as a flame retardant. Although halogen donor polymers haze good flame retarding properties, they also tend to be unstable to U.V. light. Accordingly, prior art blends of PVC and low molecular weight acrylic polymers which include relatively high proportions typically about 70% by weight or more of PVC, rend to degrade upon prolonged exposure to UV light. In the capstock polymer composition of the invention, the proportion of halogen donor component is reduced relative to the prior art blends. The relatively low proportion of halogen donor component, in combination with the use of high molecular weight acrylic polymers, confers excellent U.V. stability on the capstock polymer composition of the invention.

The halogen-donor component is preferably PVC, but other suitable halogen donor polymers include halogen-containing polymers such as chlorinated polyethylene, fluoropolymers, e.g. polyvinylidene fluoride and polytetrafluoroethylene, polyvinylidene chloride, and brominated polyacrylates. Other halogen donors that can be mentioned are hexabromocyclododecane, octabromodiphenyl ether and Cereclor (which is available from Imperial Chemical Industries plc).

If the halogen donor component is PVC, then it preferably has a K value of from about 50 to about 65. A suitable commercial material is Evipol SH5730 available from EVC Limited of 1 King's Court, Manor Farm Road, Runcorn, Cheshire WA7 1Hz, England or Benvic ER1525/1A available from Solvay Chemicals, Grovelands Business Centre, Boundary Way, Hemel Hempstead, Hertfordshire HP2 7TE, England.

The capstock polymer composition further comprises an effective amount, typically from about 1% by weight up to about 10% by weight of a halogen volatilisation agent whose function is to combine with halogen radicals released by the halogen donor upon application of a flame to the surface of the capstock polymer composition and from a volatile halide by reaction therewith. Examples of suitable halogen volatilisation agents include antimony oxide, antimonate salts such as an alkali metal antimonate, e.g. sodium antimonate, and stannate salts such as zinc stannate, or a mixture of two or more thereof. Preferably the capstock polymer composition contains from about 3% by weight up to about 8% by weight of halogen volatilisation agent. Halogen radicals released by the halogen donor, in the presence of a flame, combine with, for example, antimony oxide to form the volatile antimony trichloride, $Sb_2Cl_5$, it is postulated. In the flame this dissociates to form halogen radicals again which react with hydroxy radicals which are believed to be the radicals which are principally responsible for spread of a flame. By trapping the hydroxy radicals, the free radical chain reaction is terminated, thus helping to prevent further spread of flame.

In a preferred composition a synergistic combination of PVC and antimony oxide (or sodium antimonate) is used which forms volatile radical scavengers which terminate the flame propagation step in the burning process. The ratio of PVC to antimony oxide (or sodium antimonate) must be maintained for efficient use of the halogens. The presence of PVC reduces the UV resistance of the capstock. The heat and shear sensitive nature of the polymer necessitates addition of PVC to the capstock polymer composition at a relatively low temperature (e.g. less than about 200° C.) so as to avoid the danger of a highly UV sensitive material being produced due to the formation of hyper-sensitive radicals caused by dehydrochlorination of the polymer backbone.

composition. For example, a PVC stabiliser, such as a carboxylated organotin available from Ciba Geigy Limited of Hulley Road, Macclesfield, Cheshire SK10 2NX, England under the designation Irgastab T-9 or epoxidised soya bean oil available from Ciba-Geigy Limited under the designation Irgaplast-39 may be used.

A heat sink material is another example of a minor optional ingredient. Such heat sink materials include alumina trihydrate and magnesium hydroxide.

As an example of another minor ingredient small quantities of fluoropolymers such as polytetrafluoroethylene (PTFE) may be used to improve the processability of the material during manufacturing. One suitable commercial material is Lancowax TF1778 available from Capricorn Chemicals of Lisle Lane, Ely, Cambridgeshire CB7 4AS, England. An absorber of ultra-violet light, such as the benzotriazol Tinuvin 320 available from CIBA Geigy Limited or Lowilite 53, available from Great Lakes, P.O. Box 44, Oil Sites Road, Ellesmere Port, South Wirral, L65 4GD, England, may also be incorporated as a minor ingredient in the capstock polymer composition.

The capstock polymer composition of the invention may further comprise a pigment or mixture of pigments for imparting colour to the composition. Typically the amount of pigment or mixture of pigments does not exceed about 10% by weight of the composition, more usually from about 0.5% to about 5% by weight of the composition. Suitable pigments include those set out in the following Table 1.

TABLE 1

| Chemical Name | Trade Mark | Supplier Name & Address |
| --- | --- | --- |
| Iron Oxide | Bayferrox 130B | Bayer plc, Strawberry Hill, Newbury, Berkshire RG14 1JA, England |
| Iron Oxide Black | Bayferrox 303T | Bayer plc, Strawberry Hill, Newbury, Berkshire RG14 1JA, England |
| Carbon Black | Black Pearls 900 | Cabot Carbon Ltd., Lees Lane, Stanlow, Ellesmere Port, South Wirral L65 4HT, England |
| Azo Condensation Product | Chromophtal Brown 5R | Ciba Specialty Chemicals, Hulley Road, Macclesfield, Cheshire SK10 2NY, England |
| Iron Oxide | Colorthem 20 | Bayer plc, Strawberry Hill, Newbury, Berkshire RG14 1JA, England |
| Phthalocyanine | Heliogen Green L8730 | BASF plc, Cheadle Hulme, Cheshire SK8 6QG, England |
| Iron Chrome Spinel | Irgacolor Black 10399 | Ciba Specialty Chemicals, Hulley Road, Macclesfield, Cheshire SK10 2NY, England |
| Carbon Black | Regal Black 400 | Cabot Carbon Ltd., Lees Lane, Stanlow, Ellesmere Port, South Wirral L65 4HT, England |
| Titanium Dioxide | Tiona RCL628 | Millenium Inorganic Chemicals, P.O. Box 26, Grimsby DN41 8DP, England |

The char-inducing component is typically present in an amount of from about 2% to about 15% by weight of the capstock polymer composition. It may be a vitrifying ceramic material, such as Ceepree Microfine, which is a product of Brunner Mond Limited available from Ceepree Products of 135a Linaker Street, Southport, Merseyside PR8 5DF, England. Other suitable char-inducing components are zinc borate, zinc phosphate, zinc stannate, and phosphonates, such as dimethyl methylphosphonate.

Other ingredients may be incorporated in the capstock polymer composition of the invention, typically in amounts not exceeding about 5% by weight of the capstock polymer In selecting a pigment for incorporation into a capstock polymer composition it is preferred to selected an inorganic pigment, preferably one that has a low heat gain when exposed to sunlight.

The invention also provides a polymer laminate comprising a base material, such as PVC, and a layer of a capstock polymer composition according to the invention. Such a polymer laminate can be used to make building materials and products, such as window systems, including profiles for al types of windows, door sets and associated items; roofline and cladding products, such as fascia, bargeboards, soffits, shiplap and vee groove cladding; rainwater systems, such as guttering, downpipes and accessories; and piping systems, such as waste water and process piping for use above and below ground. In such products the base material can be in expanded form, for example expanded PVC.

Preferably, the layer has a thickness of from about 40 $\mu$m to about 500 $\mu$m. For use on rigid base polymers, such as PVC, thicknesses of from about 40 $\mu$m to about 100 $\mu$m can be used. However, a thicker layer may be desirable when the base polymer is foamed, for example foamed PVC. In this case the layer is desirably at least about 150 $\mu$m to about 200 $\mu$m thick in order to hide any surface blemishes due to the foamed nature of the underlying base polymer.

The capstock polymer composition of the invention has a number of important advantages over capstock materials hitherto known. The capstock polymer composition of the invention does not depend for its weatherability and U.V. stability on the use of fluoropolymers, which are very expensive and also environmentally poor materials because of the difficulty of breaking down carbon-fluorine bonds in the environment.

The use in the capstock polymer composition of the invention of high molecular weight acrylic polymers confers excellent mechanical properties, or strength and rigidity, on the capstock polymer composition of the invention and also confers good U.V. stability on the capstock polymer compositions.

The flame retardancy of the composites of the invention is maintained, despite the relatively low proportion of halogen donor polymers therein, at an excellent level through the supplemental fire retardant effect of the char-inducing material.

Prior art acrylic/PVC blends have used relatively low molecular weight acrylic polymers. Lower molecular weight acrylic polymers have poorer mechanical properties and less U.V. stability than do the high molecular weight acrylic polymers used in this invention. Hitherto, it has not been possible to use higher molecular weight acrylic polymers because of degradation of the PVC at the melt temperature of the acrylic polymer. The invention allows high molecular weight acrylic polymers to be used without degrading the PVC. Thus the invention preferably utilises a blend of a high molecular weight acrylic polymer with a low molecular weight acrylic polymer.

A number of minor ingredients are desirably incorporated in the composition of the invention.

Further discussion of the essential ingredients of the composite is included below as part of general discussion of the preferred and minor ingredients: Oroglas DRT/HFI-10—High $M_w$ Polymethylmethacrylates (PMMAs).

These high Mw PMMA's are commercially available from Atohaas UK Limited, of 1 Focus Park, Ashbourne Way, Cranmore Boulevard, Shirley, Solihull B90 4QU, England and confer good mechanical properties and excellent UV stability on the composite materials of the invention, as well as having good adhesion to the base plastic, for example PVC.

Paraloid B-67 Low $M_w$ Poly (iso-Butyl Methacrylate) (IBMA)

This low Mw acrylate resin has a Tg around 50° C. It may be used to improve the processibility of the Oroglas resins by reducing the Tg of the overall system.

Microfine Ceepree

This intumescent ceramic powder is commercially available from Ceepree Products, of 135a Linaker Street, Southport, Merseyside PR8 5DF, England and vitrifies upon the action of intense heat to form an oxygen barrier layer on the surface of the material. This action, along with the effect of the radical scavenging polymer renders the capstock material of the invention incapable of supporting a flame.

Pigment

High durability pigments may be used to maintain good colour retention properties of the capstock under the action of UV light. To impose low heat gain properties to the material highly IR reflecting or low IR absorbing pigments are used, for example one or more of the pigments listed in Table 1 above.

Irgastab T-9/Irgaplast 39

These primary and secondary, respectively, PVC heat stabilisers are used to limit the formation of active radical centres on the PVC by limiting their propagation (T-9) and deactivating the autocatalytic HCl produced (T-39).

Lancowax TF 778

This material is a PTFE wax used a process aid to help the mixed melt material flow through the extrusion die in the manufacturing process.

Tinuvin 320

This material is a UV absorber which helps co project the PVC in the capstock of the invention as well as preventing transmission of the UV to the base plastic when coated with a capstock material according to the invention.

Tinuvin 770

This is a hindered amine light stabiliser (HALS)

Uniwax 1760

This is a polyethylene wax lubricant.

A particularly preferred capstock polymer composition according to the invention comprises a blend of:

from 40 to 75% by weight of the composition of a melt extrudable acrylic polymer component;

from 10% to 30% by weight of the composition of a polyvinyl chloride which has a K value of from about 50% to about 65 as a halogen donor component;

from 3% to 8% by weight of the composition of sodium antimonate or antimony trioxide as a halogen volatilisation agent; and from 2% to 15% by weight of the composition of at least one zinc salt selected from zinc stannate and zinc borate as a char-inducing component.

In order that the invention may be properly understood and fully carried into effect, a number of specific examples will now be fully described.

EXAMPLE 1

A capstock composition according to the invention was made by blending components A and B using a screw extruder with a supplementary side feeder.

| Component A | parts by weight | |
|---|---|---|
| Oroglas | 22.65 | High Mw, high impact, PMMA |
| Oroglas | 22.65 | Med/high Mw, high impact PMMA |
| Paraloid B-67 | 10.00 | Low Mw IBMA |
| Ceepree Microfine | 10.00 | Vitrifying ceramic fire barrier |
| Pigment | 1.1 | Low heat gain pigment package |

| Component B | | |
|---|---|---|
| | parts by weight | |
| Evipol SH5730 | 25.00 | Suspension PVC(K value of 57) |
| Irgastab T-9 | 2.00 | Carboxylated organotin heat stabiliser |
| Irgaplast T-39 | 2.00 | Epoxidised soya bean oil, HCl sink |
| Lancowax TF1778 | 0.20 | PTFE wax |
| Timinox RT | 6.50 | Low pigmentary antimony oxide ($Sb_2O_3$) |
| Tinuvin 320 | 0.53 | UV absorber, benzotriazol type |

Component A contains the main binder, some fire barrier and the pigment, and is added in the main feed of the extruder. Due to the high viscosity of this material during the melting process a lot of shear heat is generated in the extruder. The screw is set to melt the birder material quickly and compound the inorganic additives before going through a forwarding cooling stage. This brings the melt temperature down from around 230° C. to around 195° C. At this point Component B, containing the heat sensitive PVC, is added through a side feeder, along with the stabiliser package, wax and the fire synergist. After a quick mix the product is degassed under vacuum. It is then discharged through a single strand die and quenched in a water bath before being pelletized and dried.

EXAMPLE 2

The following method was used to produce a capstock composite from the following components:

| Component A | | |
|---|---|---|
| Trade Name | % by weight | Chemical Name |
| Oroglas HFl-10 | 26.08 | Med/High $M_w$ High Impact PMMA |
| Oroglas DRT | 26.08 | High $M_w$ High Impact PMMA |
| Flamtard Z10 | 5.00 | Zinc Borate |
| Irgaplast 39 | 1.04 | Epoxidised Soya Bean Oil |
| Uniwax 1760 | 1.50 | Ethylene Bis-Stearamide |
| Pigment | 2.50 | Low heat gain pigment package |

| Component B | | |
|---|---|---|
| Trade Name | % by weight | Chemical Name |
| Benvic ER1525/1A | 29.00 | PVC Compound (K value of 64) |
| Sandovur VSU | 0.25 | Oxanilide derivative |
| Lowilite 55 | 0.25 | Benzotriazole UV absorber |
| Pyrobloc SAP-2 | 5.00 | Sodium Antimonate |
| Flamtard S | 3.30 | Zinc Stannate |

Component A contained the main binder, some fire barrier, process aids and the pigment and was added to the main feed of a twin screw extruder. The screws were set up to impart high shear to component A. Barrel temperatures were set at 215° C. and a screw speed of 250 rpm was used which gave a discharge temperature of 240° C. Once compounded, component A was pelletised and dried for 3 hours at 70° C. in an air circulating drier.

The compounded granules or Component A were then added to the pre-weighed component B, which contained the remaining shear sensitive fire retardant additives and the UV absorbers, and was compounded. The barrel temperatures were set at 180° C. and a screw speed of 180 rpm was used which gave a discharge temperature of 195° C. This second extrusion used a twin screw expander fitted with screws designed to impart low shear. The compound was pelletised and then dried in an air circulating drier for a minimum of three hours at 55° C.

EXAMPLE 3

Using a co-extruder set-up with exactly the same temperature profile as with standard PVC, the pelletised acrylic based capstock of Example 1 was poured into the capstock hopper of a co-extruder fitted with a coextrusion die suitable for extrusion of a PVC cladding panel having a coating of a capstock. At start up PVC was used both as base polymer a material and also as capstock. The capstock materials were changed over without a break in the running of the machine. It took 10 to 20 minutes for the coloured acrylic capstock to purge through the PVC. Then the coloured contoured PVC cladding panel which had an average capstock layer thickness of about 300 μm was cut to the correct length. The cladding was then ready for installation. It was subjected to BS476: Part 7: 1987 Method for Classification of the Surface Spread of Flame of Products and achieved Class 1Y.

EXAMPLE 4

The general method described in Example 2 was used to produce a capstock from the following components:

| Component A | | |
|---|---|---|
| Trade Name | % by weight | Chemical Name |
| Oroglas HFl-10 | 26.48 | Med/High $M_w$ High Impact PMMA |
| Oroglas DRT | 26.48 | High $M_w$ High Impact PMMA |
| Flamtard Z10 | 5.00 | Zinc Borate |
| Irgaplast 39 | 1.04 | Epoxidised Soya Bean Oil |
| Uniwax 1760 | 1.00 | Polyethylene wax lubricant |
| Licowax E | 0.50 | Montan wax |
| Pigment | 2.50 | Low heat gain pigment package |

| Component B | | |
|---|---|---|
| Trade Name | % by weight | Chemical Name |
| Benvic ER1525/1A | 29.00 | PVC Compound (K value of 64) |
| Pyrobloc SAP-2 | 6.50 | Sodium Antimonate |
| Sandovur VSU | 0.50 | Oxanilide derivative |
| Tinuvin 770 | 0.50 | HALS |
| Irgaplast 39 | 0.50 | Epoxidised soya bean oil |

EXAMPLE 5

0.5 m×0.5 m PVC panels were produced by the general procedure described in Example 3 using the capstock compositions of Examples 1, 2 and 4 respectively. These panels were subjected to a fire resistance test similar to that described in BS476: Part 7: 1987 Method for Classification of the Surface Spread of Flame of Products. All three panels exhibited similarly good performances in this test.

What is claimed is:

1. A polymer composition suitable for use as a capstock composition comprising a blend of:
    a melt extrudable acrylic polymer component which comprises more than 50% by weight, based on the weight of the acrylic polymer component, of a high molecular weight acrylic polymer having a molecular weight in the range of from about 150,000 to about 350,000, on a number average basis, and up to 50% by weight, based on the weight of the acrylic polymer component, of a low molecular weight acrylic polymer having a molecular weight of from about 10,000 to about 100,000, on a number average basis;

from 10% to 50% by weight of the composition of a halogen donor component;

an effective amount of a halogen volatilisation agent; and a char-inducing component which induces formation of a char upon application of flame to the composition.

2. A polymer composition according to claim 1, wherein the amount of the acrylic polymer component ranges from 40% to 75% by weight of the composition.

3. A polymer composition according to claim 1 further comprising a pigment for imparting colour to the composition.

4. A polymer composition according to claim 1, wherein the halogen donor component comprises a halogen-containing polymer which has a K value of from about 50 to about 65.

5. A polymer composition according to claim 1, wherein the halogen donor component comprises polyvinyl chloride.

6. A polymer composition according to claim 1, wherein the char-inducing component comprises a blend of vitreous materials which exhibits a broad melting range of from about 350° C. up to about 800° C. and which devitrifies at temperatures in the range of from about 800° C. to about 900° C.

7. A polymer composition according to claim 1, wherein the char-inducing component comprises zinc borate, zinc stannate, or a mixture thereof.

8. A polymer composition according to claim 1, wherein the amount of the char-inducing component ranges from about 2% by weight up to about 15% by weight of the composition.

9. A polymer composition according to claim 1, comprising a blend of:

from 40% to 75% by weight of the composition of the melt extrudable acrylic polymer component;

from 10% to 30% by weight of the composition of a polyvinyl chloride which has a K value of from about 50 to about 65 as the halogen donor component;

from 3% to 8% by weight of the composition of sodium antimonate or antimony trioxide as the halogen volatilisation agent; and from 2% to 15% by weight of the composition of at least one zinc salt selected from zinc stannate and zinc borate as the char-inducing component.

* * * * *